United States Patent
Hou et al.

(10) Patent No.: US 8,964,371 B2
(45) Date of Patent: Feb. 24, 2015

(54) HARD DISK RACK

(71) Applicant: Giga-Byte Technology Co., Ltd., New Taipei (TW)

(72) Inventors: Chin Jen Hou, New Taipei (TW); Hsin Teng Fu, New Taipei (TW); Chi Chen Huang, New Taipei (TW); His feng Liu, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 0 days.

(21) Appl. No.: 13/869,925

(22) Filed: Apr. 24, 2013

(65) Prior Publication Data

US 2014/0021836 A1 Jan. 23, 2014

(30) Foreign Application Priority Data

Jul. 23, 2012 (TW) .............................. 101126492 A

(51) Int. Cl.
*H05K 5/02* (2006.01)
*G11B 33/02* (2006.01)
*G11B 33/12* (2006.01)

(52) U.S. Cl.
CPC *G11B 33/02* (2013.01); *H05K 5/02* (2013.01); *G11B 33/128* (2013.01)
USPC .................................. 361/679.37; 312/223.2

(58) Field of Classification Search
USPC .............................. 211/26; 312/223.1, 223.2; 361/679.33–679.39, 724, 727
See application file for complete search history.

(56) References Cited

U.S. PATENT DOCUMENTS

| | | | | |
|---|---|---|---|---|
| 6,246,580 B1 * | 6/2001 | Weng | | 361/695 |
| 6,317,329 B1 * | 11/2001 | Dowdy et al. | | 361/725 |
| 6,612,667 B2 * | 9/2003 | Tsai et al. | | 312/223.1 |
| 6,768,638 B2 * | 7/2004 | Shih | | 361/679.33 |
| 7,126,817 B2 * | 10/2006 | Li | | 361/679.37 |
| 7,206,200 B2 * | 4/2007 | Chung | | 361/679.39 |
| 7,374,259 B2 * | 5/2008 | Wu et al. | | 312/223.2 |
| 7,375,960 B2 * | 5/2008 | Blaalid et al. | | 361/679.33 |
| 7,492,584 B2 * | 2/2009 | Fan et al. | | 361/679.33 |
| 7,576,978 B2 * | 8/2009 | Fan et al. | | 361/679.37 |
| 7,679,900 B2 * | 3/2010 | Lee et al. | | 361/679.39 |
| 7,855,881 B2 * | 12/2010 | Tsai et al. | | 361/679.37 |
| 7,864,519 B2 * | 1/2011 | Lin et al. | | 361/679.33 |
| 7,995,335 B2 * | 8/2011 | Chang et al. | | 361/679.33 |
| 8,599,549 B2 * | 12/2013 | Zhou | | 361/679.37 |
| 2002/0089823 A1 * | 7/2002 | Chin | | 361/687 |
| 2003/0112596 A1 * | 6/2003 | Shih | | 361/685 |
| 2003/0230543 A1 * | 12/2003 | Chen | | 211/26 |

(Continued)

FOREIGN PATENT DOCUMENTS

TW M255964 U 1/2005
TW M356990 U 5/2009

*Primary Examiner* — Joshua Rodden
(74) *Attorney, Agent, or Firm* — Chun-Ming Shih

(57) ABSTRACT

A hard disk rack comprises a housing, a plurality of cartridges for receiving a plurality of hard disk modules, and at least one batten. The housing has a bottom, and a plurality of positioning elements disposed on the bottom at intervals. The cartridges are detachably disposed on the bottom in stacks by fastening a fastening portion to the positioning elements of the housing. The batten is pressed against the cartridges for sandwiching the cartridges between the batten and the bottom of the housing, and two opposite ends of the batten are connected to two opposite sidewalls of the housing detachably in order to facilitate the assembly and disassembly of the cartridges conveniently.

8 Claims, 13 Drawing Sheets

(56) References Cited

U.S. PATENT DOCUMENTS

| | | | |
|---|---|---|---|
| 2004/0173544 A1* | 9/2004 | Chen | 211/26 |
| 2004/0257760 A1* | 12/2004 | Record et al. | 361/685 |
| 2005/0185370 A1* | 8/2005 | Chung | 361/683 |
| 2005/0195563 A1* | 9/2005 | Chung | 361/685 |
| 2008/0117587 A1* | 5/2008 | Fan et al. | 361/685 |
| 2008/0298008 A1* | 12/2008 | Fan et al. | 361/685 |
| 2009/0196680 A1* | 8/2009 | Hu et al. | 403/102 |
| 2009/0196684 A1* | 8/2009 | Hu et al. | 403/353 |
| 2010/0002369 A1* | 1/2010 | Lee et al. | 361/679.33 |

* cited by examiner

HARD DISK RACK

CROSS-REFERENCE TO RELATED APPLICATIONS

This application claims the benefit of the filing date of Taiwan Patent Application No. 101126492, filed on Jul. 23, 2012, in the Taiwan Intellectual Property Office, R.O.C., the disclosure of which is incorporated herein in its entirety by reference.

BACKGROUND OF THE INVENTION

1. Field of the Invention

The invention relates to a rack; more particularly, to a hard disk rack.

2. Description of the Prior Art

With development of the internet and increase of the internet bandwidth, more and more information may be processed over the network. Among others, remarkable advances have been made in cloud computing in recent years. The concept of the cloud computing is sharing software, resources and information through internet connection rather than having local servers or personal devices to handle applications.

Generally, a server is used to provide more stable operating environment of the computer. By way of sever management, data or information may be collected or accessed, and fast broadband connection and high-speed computing may be provided, even during a heavy internet traffic.

A conventional server is usually equipped with plural electronic components such as a motherboard, a plurality of hard disks, a fan module and power supply within the housing. Therefore, the electronic components therewithin has to be arranged well for accommodating as many electronic components as possible. In the conventional server, the hard disks are disposed within the housing through a chassis kit located in front of the housing. In the chassis kit, multiple cartridges for receiving cartridges individually are formed in accordance with the specification of the server, i.e., rack unit U (The size of a piece of rack-mounted equipment is frequently described as a number in "U"). For example, one rack unit is often referred to as "1U", 2 rack units as "2U" and so on. If the server is a 1U model, several cartridges are deployed along a horizontal direction within the chassis kit to form a hardware configuration with the dimension of 1×4 or 1×5 for example. Similarly, if the server is a 2U model or more, several cartridges are deployed along not only a horizontal direction but also a vertical direction within the chassis kit with the dimension of 2×3, 2×4, or 3×5.

Therefore, in general, the chassis kit or other hardware selected for a server will depend on the server application and/or customization. Different applications will demand different types of hardware configurations. A 2U chassis kit can not fit for a 1U server, confining the use of the chassis kit with a specific rack unit. Particularly, the conventional chassis kit has poor expandability and flexibility and thus is not space-efficient, and it is undesirable to prepare chassis kits with different dimensions when dealing with limited space.

SUMMARY OF THE INVENTION

In view of the above, the present invention provides a hard disk rack for installing a plurality of hard disk modules that can solve all the aforementioned problems in prior art.

The present invention discloses a hard disk rack for receiving a plurality of hard disk modules, which comprises a housing, a plurality of cartridges, and at least one batten. The housing includes a bottom, a first sidewall and a second sidewall which are disposed on two opposite sides of the bottom respectively and forming a space together with the bottom, and a plurality of positioning elements are disposed within the space and arranged at intervals on the bottom. The cartridges are detachably disposed on the bottom, each of the cartridges includes at least one fastening portion corresponding to one of the positioning elements of the bottom, wherein each of the cartridges has an opening exposed from the housing, through which the hard disk modules are placed into and removed from the cartridges. The batten is located on one side of the plurality of cartridges away from the bottom and comprising a first and a second ends that are opposite each other and detachably connected to the first and the second sidewalls respectively.

The hard disk rack of the present invention, each one of the cartridges further comprises a back circuit board disposed on one side of the cartridge away from the opening and an electrical connector disposed electrically on the back circuit board and facing the opening.

The hard disk rack of the present invention, each of the cartridges further comprises at least one tenon, which is disposed on one side of the cartridge opposite to the fastening portion, and the batten further comprises a plurality of holding portions arranged at intervals between the first and the second ends and connected with the tenons of the cartridges correspondingly.

The hard disk rack of the present invention, the cartridges are stacked in the space, in which the adjacent cartridges are combined by joining the tenon to the fastening portion.

The hard disk rack of the present invention, the first and the second ends of the batten are individually provided with a fastener, and the first and the second sidewalls of the housing are individually provided with the fastening portion to be fastened to the fasteners of the first and the second ends of the batten respectively.

The present invention also discloses a hard disk rack for receiving a plurality of hard disk modules, which comprises a housing, a plurality of cartridges, two battens and a plurality of fixing elements. The housing includes a bottom, a first sidewall and a second sidewall disposed on two opposite sides of the bottom respectively and defined a space with the bottom, and a plurality of positioning elements are disposed within the space and arranged at intervals on the bottom. The cartridges are detachably disposed on the bottom of the housing, and each of the cartridges comprises a back circuit board provided with an electrical connector, a plurality of fastening portions corresponding to the positioning elements of the bottom respectively, and a plurality of tenons disposed on one side of the cartridge opposite to the fastening portions, wherein each of the cartridges further has an opening away from the back circuit board and exposed from the housing for receiving the hard disk modules, which the hard disk modules are place into and removed from the cartridges to electrically connect and disconnect to the electrical connector.

Each of the battens comprises a first and a second ends that are opposite each other and detachably connected to the first and the second sidewalls respectively, wherein a plurality of holding portions are provided between the first and the second ends corresponding to the plurality of tenons of each of the cartridges, and each of the battens is detachably located on one side of the plurality of cartridges away from the bottom and connected with the tenons of each cartridges by the holding portions. One end of each of the fixing elements is connected to the housing, and the other end of each of which penetrates the housing to be connected to the batten.

The effect of the present invention is achieved in the following way. A number of the cartridges of the hard disk rack can be selected as desired, and the cartridges can be assembled in the housing simply and quickly without cumbersome procedures, such that the hard disk rack is very convenient and efficient in use. Meanwhile, the cartridges can be assembled in different specification of the housing of the hard disk rack because the cartridges are stackable, such that the development cost of the manufacturing mold can be reduced, because there is no need to develop different type of the manufacturing mold for the cartridges with different specification. Moreover, because the appearance of the cartridges is identical, the cartridges can be stacked and stored conveniently, for utilizing the storage space effectively.

The characteristics, realization and functions of the invention are disclosed in the following description with reference to the preferred exemplified embodiments and the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Figure 1A:
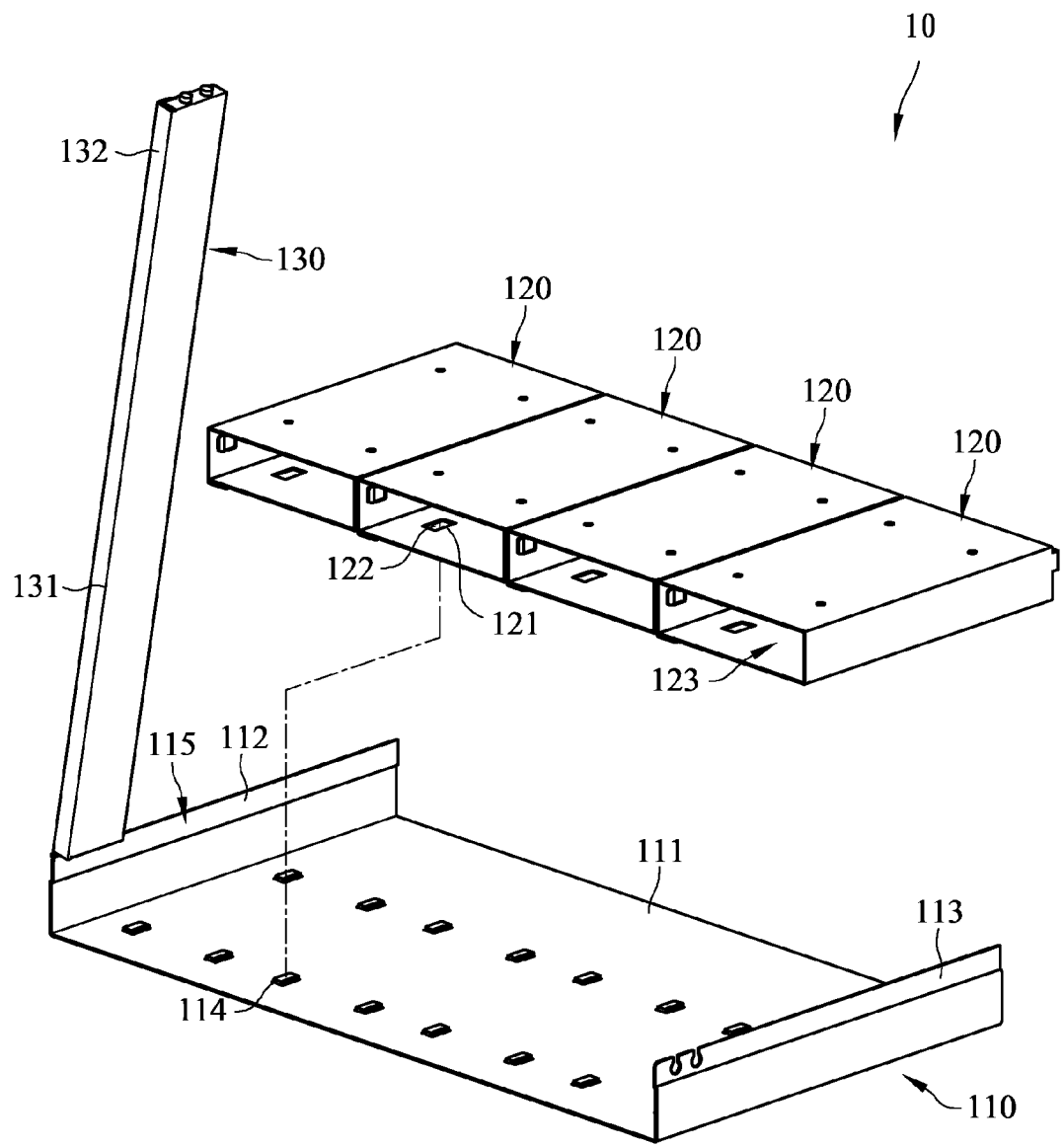
FIG. 1A is a partially exploded view of a hard disk rack according to a first embodiment of the present invention.
Figure 1B:
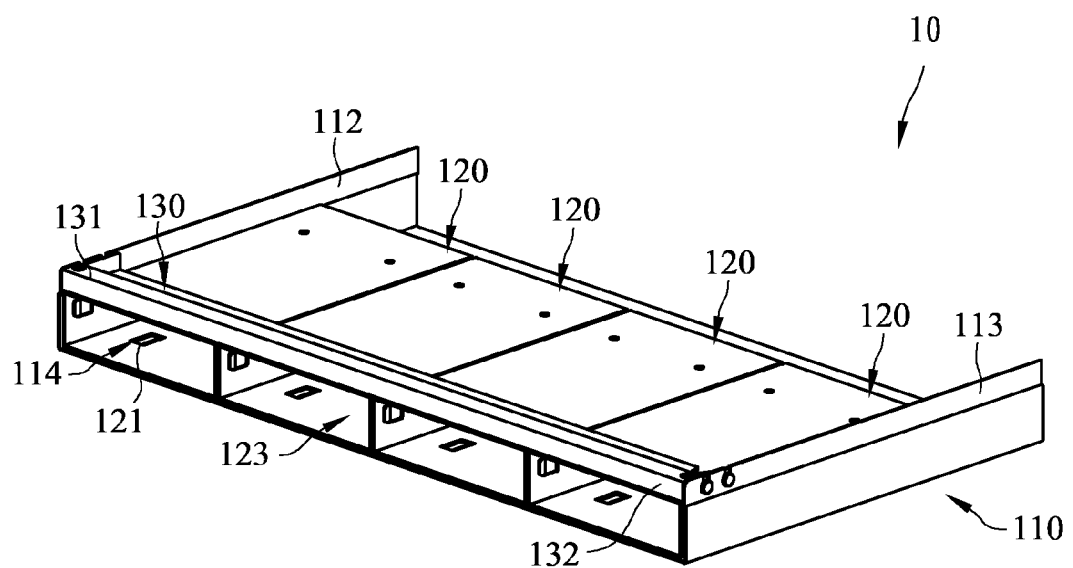
FIG. 1B is a schematic assembly view of the hard disk rack according to the first embodiment of the present invention.

Referring to FIGS. 1A and 1B, a hard disk rack 10 of a first embodiment of the present invention is used to assemble a plurality of hard disk modules, which comprises a housing 110, a plurality of cartridges 120, and a batten 130. The housing includes a bottom 111, a first sidewall 112 and a second sidewall 113, the bottom 111 is connected between the first and second sidewalls 112, 113, and provided with a plurality of positioning elements 114 which are arranged in spaced-apart disposition on the bottom 111. The first and second sidewalls 112, 113 are substantially perpendicular to the bottom 111, and an accommodating space 115 is defined between the bottom 111, the first sidewall 112 and the second side wall 113. The plurality of positioning elements 114 are located in the accommodating space 115, and may be, but not limited to, disposed at the bottom 111 and spaced apart from the first sidewall 112 to the second sidewall 113.

Each one of the cartridges 120 of the hard disk rack 10 is substantially a hollow shell, and one side surface of the cartridge 120 is provided with a fastening portion 121 corresponding to the positioning element 114 of the housing 110, wherein an aperture 122 is formed on the fastening portion 121, and the shape of the aperture and the structure of the positioning element 114 of the housing are matched. Therefore, when assembling the hard disk rack 10, the plurality of the cartridges 120 are detachably buckled the plurality of the positioning element 114 of the housing 110 by the fastening portion 121 respectively, that the positioning element 114 of the housing 110 is passed through the aperture 122 of the cartridge 120 and abuts against the edge of the fastening portion 121 in the aperture 122, such that the mobility of the cartridges 120 is limited along a horizontal direction of the bottom 111 of the housing 110.

The batten 130 of the hard disk rack 10 includes a first end 131 and a second end 132 relative to the first end 131 which are connected between the first and the second sidewalls 112, 113 of the housing 110, wherein the first end 131 of the batten 130 is pivoted to the first sidewall 112 of the housing 110, and the second end 132 of the batten 130 is fastened on the second sidewall 113 of the housing 110 detachably. When the cartridges 120 are disposed on the bottom 111 of the housing 110, the batten 130 is pressed on one side of the cartridges 120 away from the bottom 111, such that the cartridges 120 are sandwiched between the batten 130 and the bottom 111 of the housing 110. In addition, the cartridge 120 has an opening 123 adjacent to the fastening portion 121, and when the cartridge 120 is sandwiched between the batten 130 and the bottom 111 of the housing 110, the opening 123 of the cartridge 120 is exactly located therebetween and exposed to the housing 110, so that the hard disk module can be assembled in or disassembled from the cartridge 120 through the opening 123.

As above-mentioned hard disk rack, each one of the cartridges is detachably assembled in the hard disk rack, such that the number of the cartridges assembled in the housing can be adjusted as desired, and when the required number of the cartridges are assembled in the housing, the batten is pressed on the cartridges and fixed on the housing to complete the assembly procedure of the hard disk rack. In this way, the assembly efficiency of the hard disk rack is increased, and the hard disk rack can be constituted in various specification by increasing or decreasing the number of the cartridges to meet the number of the hard disk modules as required, such that there is unnecessary to develop the production molds with different number of the cartridges, and reduce the costs of the hard disk rack.

Figure 1C:
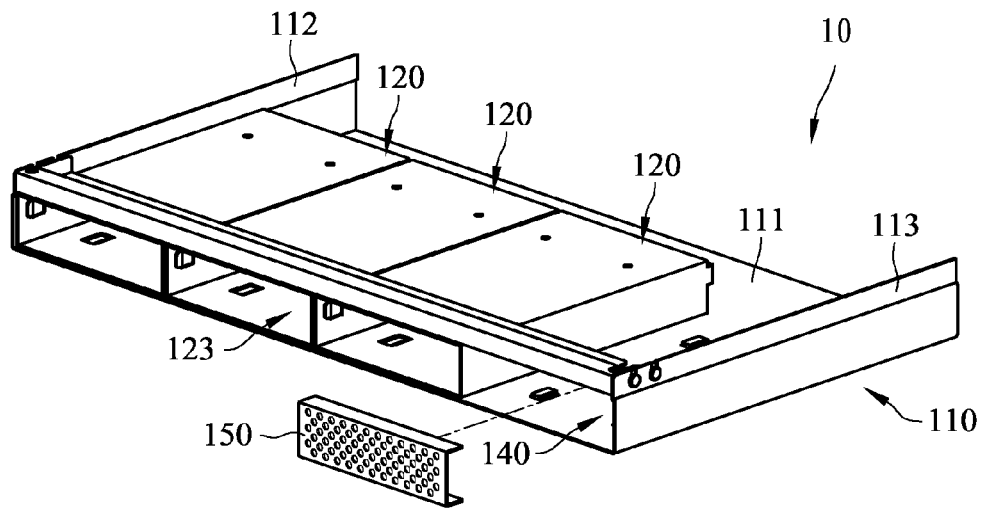
FIG. 1C is a partially exploded view of a hard disk rack provided with a baffle according to the first embodiment of the present invention.
Figure 1D:
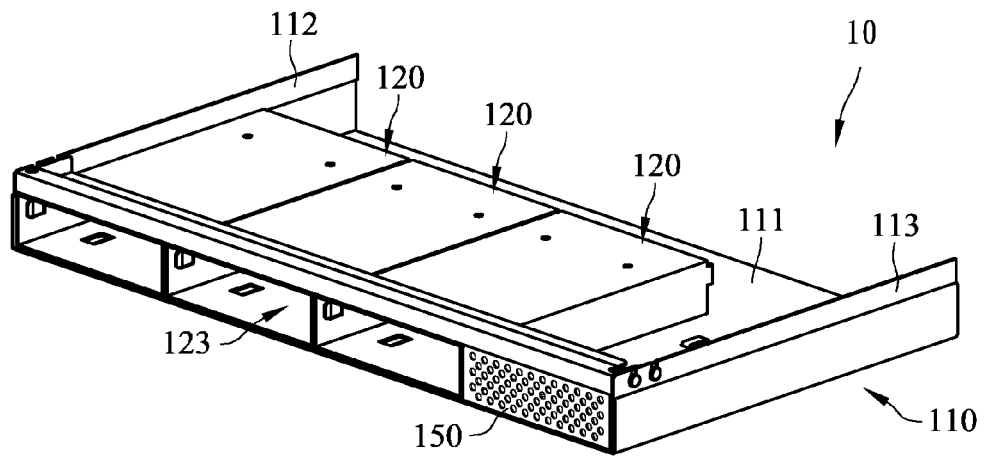
FIG. 1D is a partially exploded view of the hard disk rack provided with the baffle according to the first embodiment of the present invention.

In addition, please refers to FIGS. 1C and 1D, in application, if number of the cartridges 120 as desired is smaller than the maximum number of the cartridges 120 that can be assembled in the housing 110, for example, if the maximum number of the cartridges 120 that can be assembled in the housing 110 is four, and the required number of the cartridges 120 is just three, in this case, when the plurality of the cartridges 120 are arranged on the bottom from the first sidewall 112 to the second sidewall 113 of the housing 110, the last cartridge 120 and the second sidewall 113 of the housing 110 will be separated by a spacing that forms a channel 140 between the last cartridge 120 and the second sidewall 113. As result, a baffle 150 is provided between the plurality of the cartridges 120 and the second sidewall 113 of the housing 110 to cover the channel 140 on one side of the housing 110 where the opening 123 of the cartridge 120 is exposed to. In this way, the appearance integrity of the hard disk rack can be maintained after the plurality of the cartridges are installed therein.

It is noted that, in this embodiment, the position and the number of the baffle 150 are able to change in accordance with the position and the number of the channel 140 formed in the housing 110, for example, if the channel 140 is formed in the housing 110 adjacent to the first sidewall 112 or the second sidewall 113, the single baffle 150 is used to cover the channel 140; and if the channels 140 are formed in the housing 110 adjacent to the first and the second sidewalls 112, 113 respectively, two of the baffles 150 are needed to cover the channels 140 correspondingly.

Figure 2A:
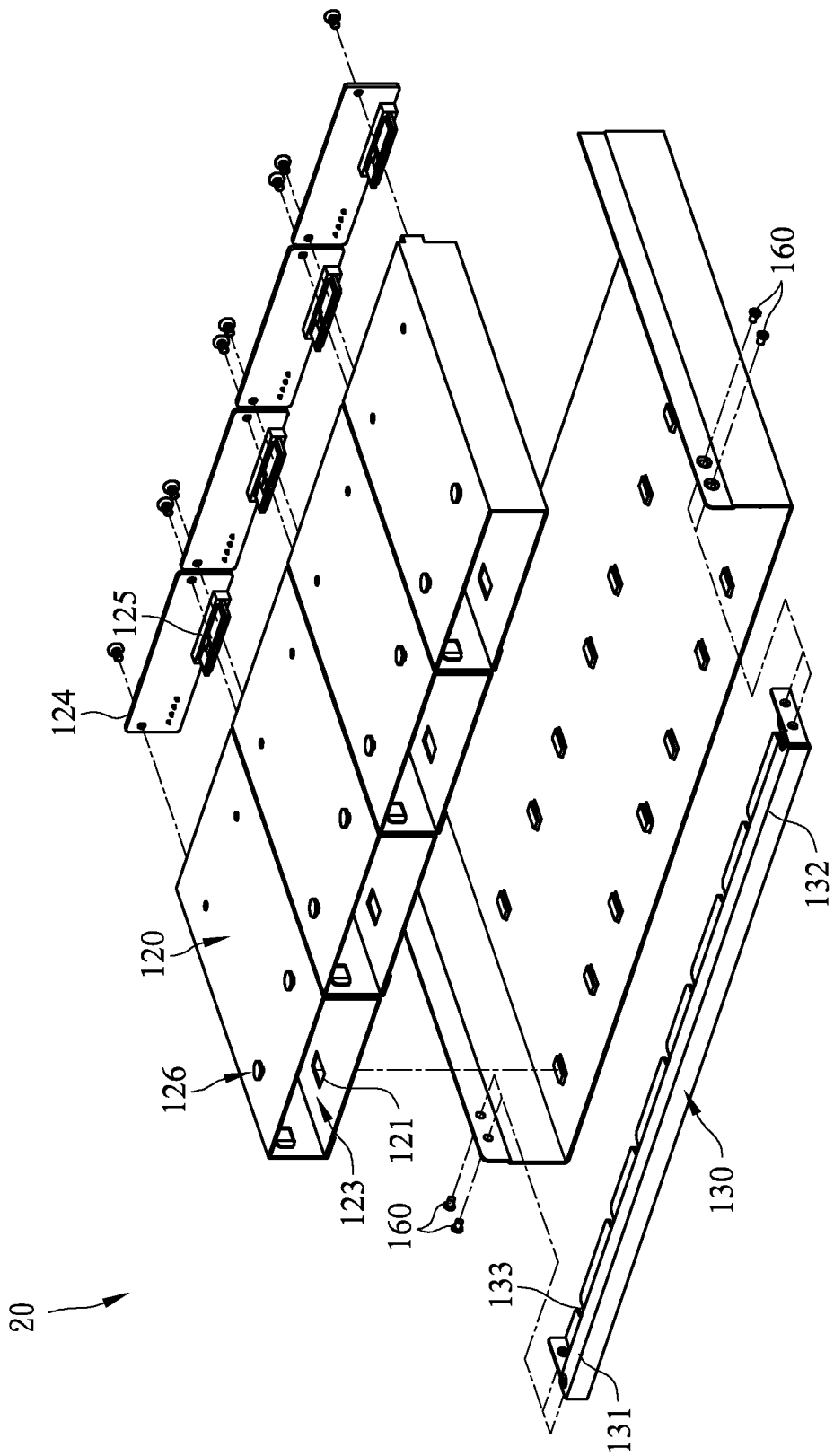
FIG. 2A is an exploded view of a hard disk rack according to a second embodiment of the present invention.
Figure 2B:
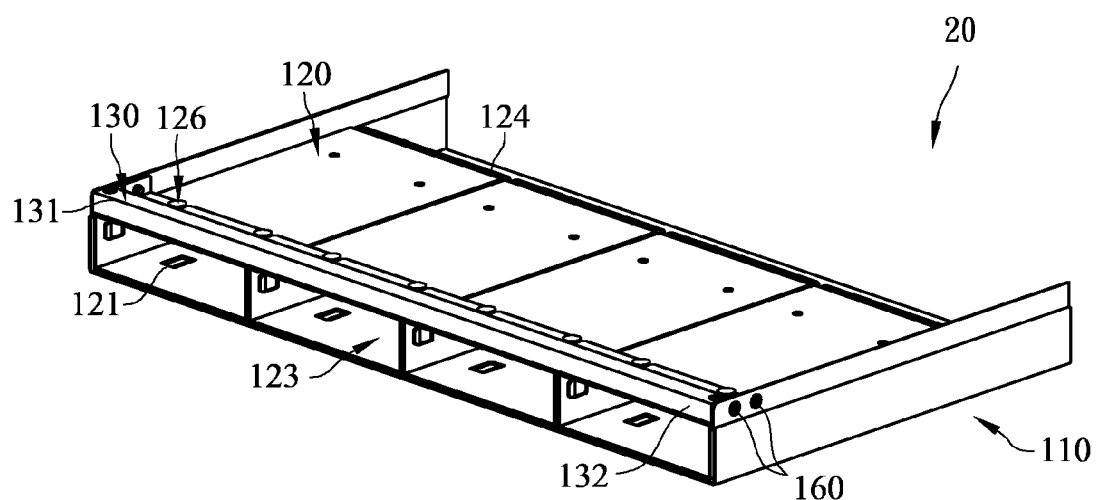
FIG. 2B is a schematic assembly view of the hard disk rack according to the second embodiment of the present invention.
Figure 2C:
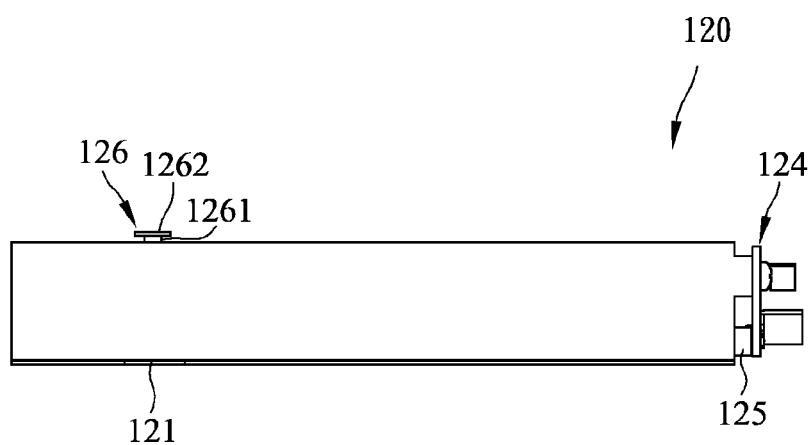
FIG. 2C is a lateral view of the hard disk rack according to the second embodiment of the present invention.

Referring to FIGS. 2A and 2B and 2C, are exploded and schematic assembly views and a lateral view of a hard disk rack respectively according to a second embodiment of the present invention.

The hard disk rack 20 of the second embodiment of the present invention is similar to that of the first embodiment except that a number of a back circuit board 124. In the first embodiment, the hard disk rack 10 may be, but not limited to, further disposed a back circuit board 124 in the housing 110, and a plurality of electrical connectors are disposed on the back circuit board 124 corresponding to the plurality of the cartridges 120, such that the plurality of the hard disk modules can be electrically connected to the same back circuit board 124 via the electrical connectors after assembled in the cartridges 120.

However, in the second embodiment, each one of the cartridges 120 of the hard disk rack 20 are further provided with a back circuit board 124 and an electrical connector 125, wherein the back circuit board 124 is disposed on one side of the cartridge 120 away from the opening 123, and the electrical connector 125 is disposed on the back circuit board 124. Hence, when the hard disk module is assembled in the cartridge 120 via the opening 123, it can be electrically connected to the back circuit board 124 individually through the electrical connector 125. In this way, if one of the back circuit boards 124 is damaged, it is just needed to repair or replace the cartridge 120 having the damaged back circuit board 124 without interfering with normal usage of the rest of the cartridges, such that the repair of the hard disk rack 20 is more convenient, especially when used in combination with the detachable batten 130 and cartridges 120.

Furthermore, in this embodiment, the cartridge 120 of the hard disk rack 20 further includes at least one tenon 126, and the tenon 126 and the fastening portion 121 are respectively disposed on two opposite sides of the cartridge 120. The tenon has a neck 1261 and a head 1262, the neck 1261 is connected between the head 1262 and the surface of the cartridge 120, and the width of the neck 1261 is smaller than the width of the head 1262. In addition, one side of the batten 130 further forms with a plurality of holding portion 133 which are indented the side edge of the batten 130 and arranged at intervals from the first end 131 to the second end 132 of the batten 130.

Additionally, the width of the holding portion 133 of the batten 130 is matching that of the neck of the tenon 126, in this way, when the batten 130 is pressed on the plurality of the cartridges 120, the tenons 126 of the plurality of the cartridges 120 can be buckled by the holding portions 133 of the batten 130, wherein the holding portions 133 of the batten 130 are against the neck 1261 of the tenon 126, and the batten 130 is blocked by the head 1262 of the tenon 126 to prevent the batten 130 separating from the cartridges 120 along an axial direction of the tenon 126. It is noted to that a direction of the batten 130 combined with the cartridges 120 and a direction of the cartridges 120 combined with the bottom of the housing may be the same or opposite direction, and if the direction is opposite, the cartridges 120 will be firmly fastened on the housing 110 by sandwiching between the holding portion 133 of the batten 130 and the positioning element 114 disposed on the bottom 111.

After that, the batten 130 can be detachably located on the housing 110 and combined with the housing 110 by a plurality of fixing elements 160, such as screws or bolts, that penetrate the first and the second sidewalls 112, 113 of the housing 110, and one end of the fixing elements 160 is connected to the housing 110, and the other end of the fixing elements 160 is passed through the housing 110 and fixed on the first and the second ends 131, 132 of the batten 130 respectively, such that the batten 130 is pressed and fixed on the plurality of the cartridges 120.

It can be understood that the batten of the hard disk rack of the above-mentioned embodiment is connected to the housing by the fixing elements, but in other embodiment of the present invention, the batten can also be connected to the housing by other means such as hinge or the like. Also, the type of the fixing element in this embodiment is an exemplary illustration, and the present invention is not limited thereto, those skilled in the art may can use other kinds of the fixing elements or change the number of the fixing elements as desired.

Figure 3:
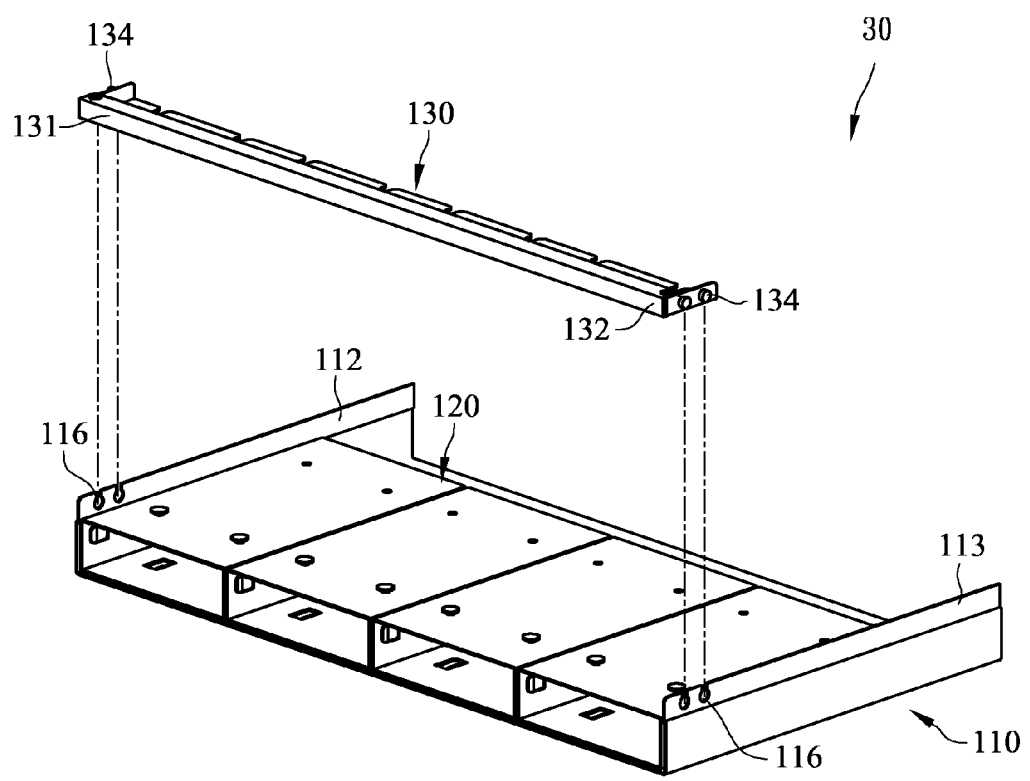
FIG. 3 is an exploded view of a hard disk rack according to a third embodiment of the present invention.

Referring to FIG. 3, which is an exploded view of a hard disk rack 30 according to a third embodiment of the present invention, the hard disk rack 30 of the third embodiment of the present invention is similar to that of the second embodiment except that a first and a second ends 131, 132 of a batten 130 are further provided with a fastener 134 that may be, but not limited to, a clasp or a post formed on the batten 130 integrally. Correspondingly, a first and a second sidewalls 112, 113 of the housing 110 are further provided with an engaging portion 116 that may be, but not limited to, a trench or a blind hole formed on the edge of the first and the second sidewalls 112, 113, and the shape of the engaging portion 116 is corresponding to the structure of the fastener of the batten 130. Therefore, when pressed on the plurality of the cartridges 120, the batten 130 can be connected between the first and the second sidewalls 112, 113 of the housing 110 by combining the fasteners 134 of the first and the second ends 131, 132 with the engaging portion 116 of the first and the second sidewalls 112, 113 of the housing 110.

Wherein, the clasped portions 134 of the batten 130 may be tight fitted to the engaging portions 116 of the first and the second sidewalls 112, 113 of the housing 110. Otherwise, the diameter of the fasteners 134 formed on the batten 130 may be larger than the gap of the engaging portion 116 formed on the edge of the first and the second sidewalls 112, 113 of the housing 110, such that when the fasteners 134 of the batten 130 is mounted in the engaging portion 116 of the housing, it will be limited therein to prevent the batten 130 separating from the housing 110.

Figure 4A:
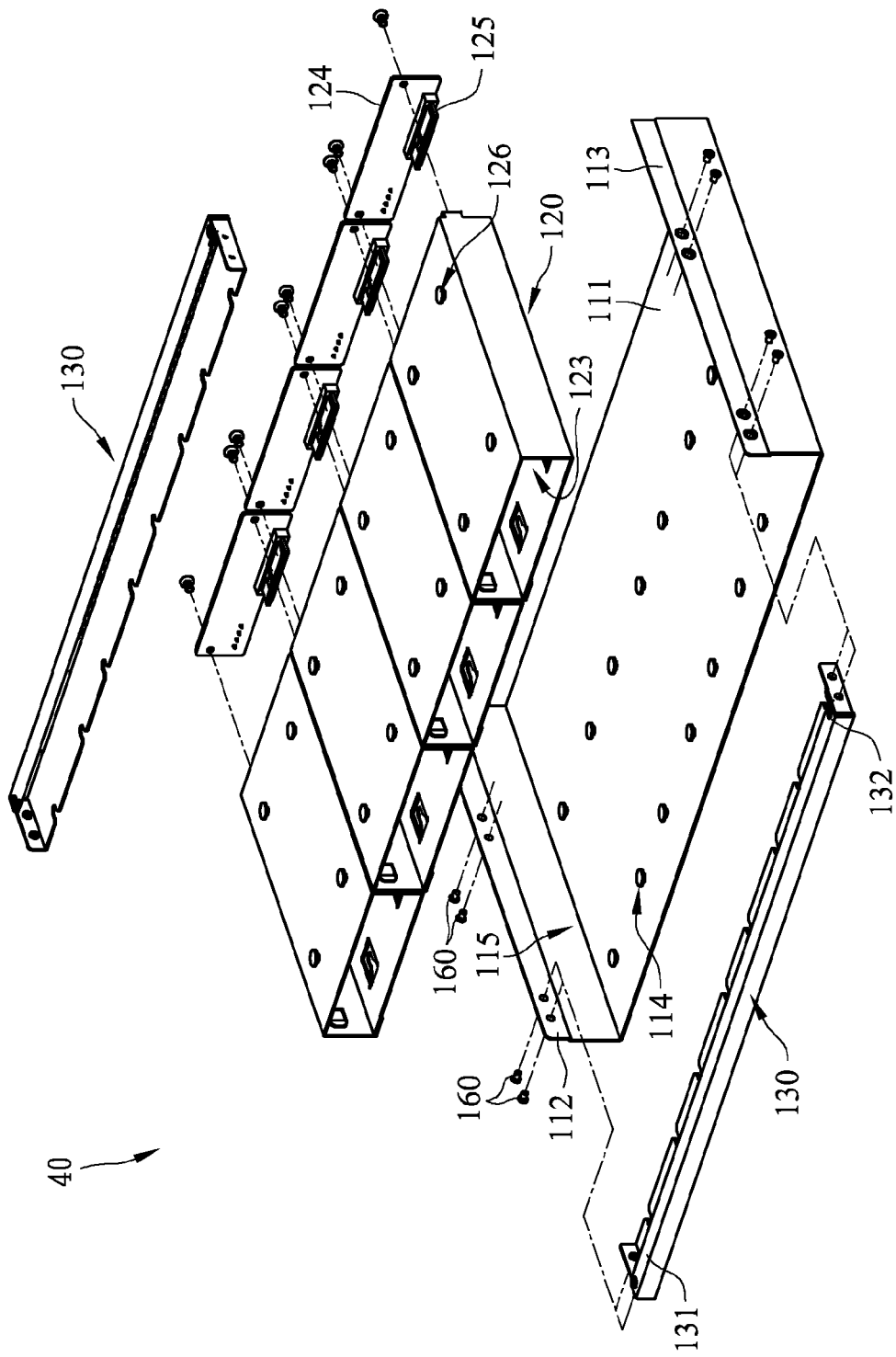
FIG. 4A is an exploded view of a hard disk rack according to a fourth embodiment of the present invention.
Figure 4B:
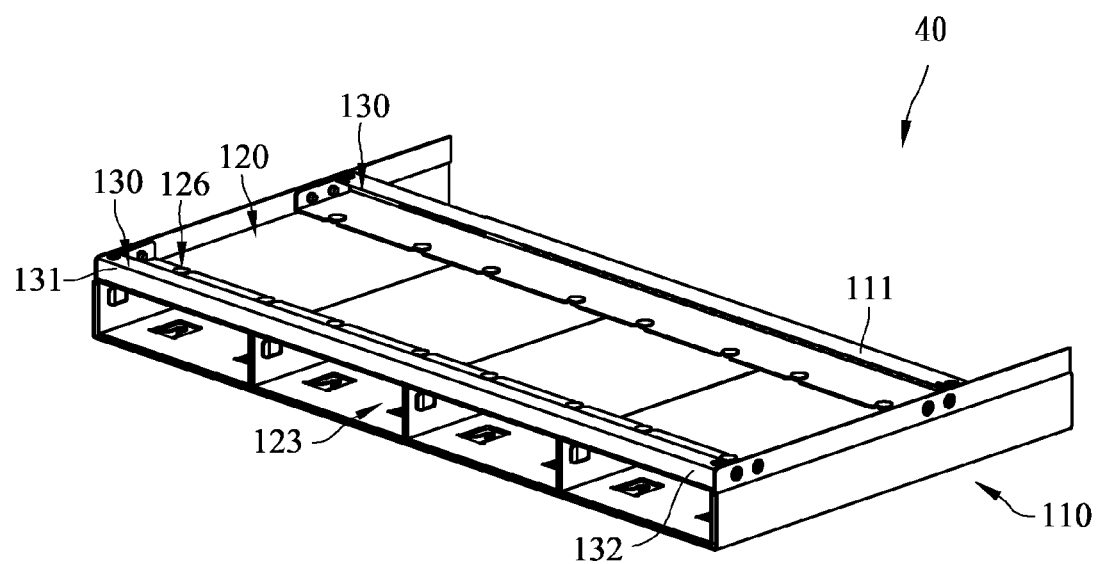
FIG. 4B is a schematic assembly view of a hard disk rack according to the fourth embodiment of the present invention.

Referring to FIGS. 4A and 4B, a hard disk rack 40 of a fourth embodiment of the present invention includes a housing 110, a plurality of cartridges 120, and two battens 130. The housing includes a bottom 111 provided with a plurality of positioning elements 114, and a first sidewall 112 and a second sidewall 113 which are respectively connected to opposite side of the bottom 111 and substantially perpendicular to the bottom 111 to define an accommodating space 115 therebetween, wherein the plurality of the positioning elements 114 are disposed on the bottom 111 in the accommodating space 115 and arranged in two rows and at intervals from the first sidewall 112 to the second sidewall 113. In addition, each positioning element 114 includes a support portion 1141 and a restricted portion 1142, the support portion 1141 is connected between the restricted portion 1142 and the bottom 111, and the width of the support portion 1141 is smaller than the width of the restricted portion 1142.

The plurality of cartridges 120 are detachably disposed on the bottom plate 111 of the housing 110, and each one of the cartridges 120 has an opening 123 formed on the surface of the cartridge 120 and penetrated opposite side of the cartridge 120, such that the cartridge 120 substantially a hollow shell. In addition, the cartridge 120 includes a back circuit board 124, an electrical connector 125, a plurality of fastening portion 121 and a plurality of tenons 126. The back circuit board 124 is disposed on one side of the cartridge 120 away from the opening 123 corresponding to the opening 123, and the electrical connector 125 is disposed on the back circuit board 124. The fastening portions 121 and the tenons 126 are respectively disposed on two opposite surfaces of the cartridge 120 between the opening 123 and the back circuit board 124 with symmetry, and the position of the fastening portions of the cartridges are corresponding to that of the positioning elements 114 of the bottom 111.

Figure 4C:
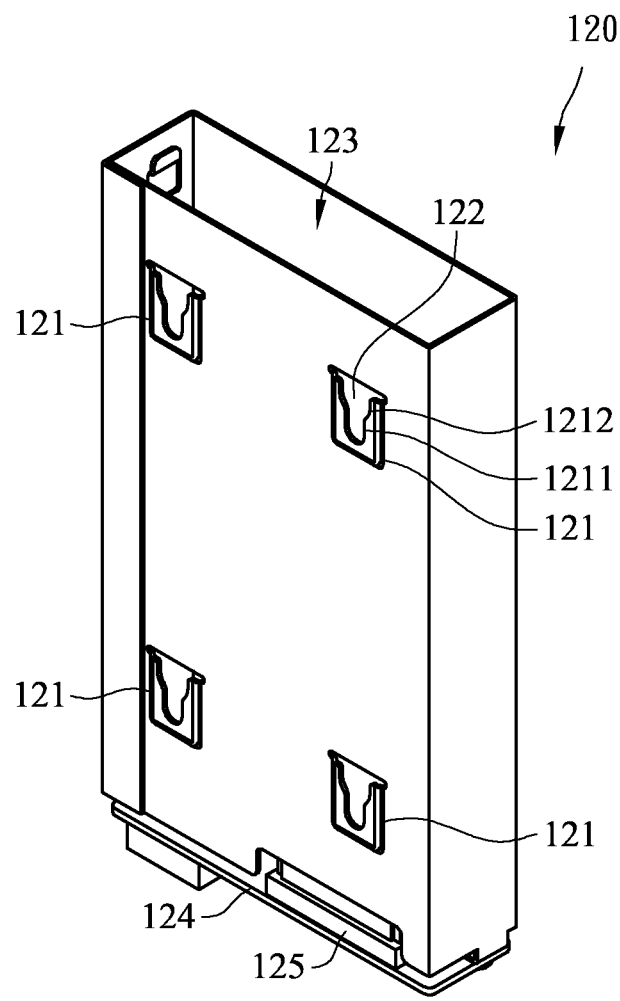
FIG. 4C is a three-dimensional diagram of a cartridge of the hard disk rack according to the forth embodiment of the present invention.
Figure 4D:
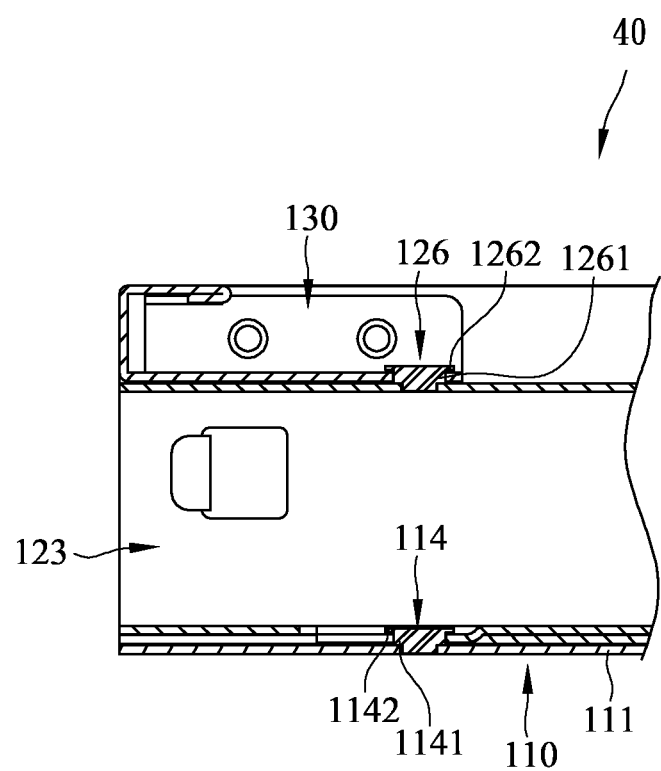
FIG. 4D is a sectional view of the hard disk rack according to the fourth embodiment of the present invention.

Referring to FIGS. 4A, 4C and 4D, each one of the fastening portions 121 of the cartridge 120 includes a shrinking section 1211 and an expanding section 1212, and an aperture 122 is formed on the fastening portion 121. The shrinking section 1211 and the expanding section 1212 are around the aperture 122 and connected to each other, wherein the width of the shrinking section 1211 is smaller than that of the expanding section 1212, such that the aperture 122 is a gourd-shaped hole formed on the fastening portion 121.

Also, the width of the shrinking section 1211 of the fastening portion 121 is corresponding to that of the support portion 1141 of the positioning element 114, and the width of the expanding section 1212 is equal to or larger than that of the restricted portion 1142 of the positioning element 114. In this way, in assembly, the cartridge 120 is able to buckle the plurality of the positioning elements 114 of the housing 110 by the plurality of the fastening portion 121 correspondingly, wherein the positioning element 114 is passed through the aperture 122 via the expanding section 1212 of the fastening portion 121 firstly, and then, against the shrinking section 1211 of the fastening portion 121, such that the cartridge 120 is immovable along a horizontal direction of the bottom 111.

Moreover, because the width of the shrinking section 1211 of the fastening portion 121 is smaller than that of the restricted portion 1142 of the positioning element 114, the cartridge 120 is temporarily fixed on the bottom 111 of the housing 110 and can not be separated from the bottom 111 along an axial direction of the positioning element 114.

In this embodiment, each one of the tenons 126 of the cartridge 120 includes a neck 1261 and a head 1262, one end of the neck 1261 is connected to the head 1262, and the other end of the neck 1261 is connected to the surface of the cartridge 120, wherein the width of the neck 1261 is corresponding to that of the shrinking section 1211 of the fastening portion 121, i.e. Smaller than or equal to the width of the shrinking section 1211, and the width of the head 1262 is corresponding to that of the expanding section 1212 of the fastening portion 121, therefore, the shape of the tenons 126 of the cartridge 120 is similar to that of the positioning element 114 of the housing 110.

Referring to FIGS. 4A, 4B and 4D, two of the battens 130 of the hard disk rack 40 may be, but not limited to, respectively pressed on one side of the cartridges 120 adjacent to the opening 123 and the other side of the cartridges 120 adjacent to the back circuit board 124. Each one of the battens 130 includes a first end 131 and a section end 132, and a plurality of holding portions 133 are formed between the first and the second ends 131, 132 of the batten 130, wherein the holding portions 133 may be, but not limited to, a wriggling structure formed on the side edge of the batten 130 from the first end 131 to the second end 132. Additionally, the shape of the holding portions 133 is corresponding to that of the neck 1261 of the tenons 126 of the cartridge 120, such that the battens 130 is able to clasp the corresponding necks 1261 of each row of the tenons 126 by the holding portion 133, and the mobility of the battens 130 is restricted by the head 1262 of the tenon 126 to prevent the battens 130 separating from the cartridges 120 along an axial direction of the tenons 126.

In addition, the battens 130 may be, but not limited to, clasped the tenons of the cartridge 120 from opposite direction to sandwich the cartridges 120 and firmly fixed the cartridges on the bottom 111 of the housing 110, such that the mobility of the cartridges 120 along a horizontal direction of the bottom 111 is restricted, and the structure of the hard disk rack 40 is more stable.

Finally, the fixing elements 160 such as screws or bolts are respectively penetrated the first and the second sidewalls 112, 113 of the housing 110, and screwed on the first and the second ends 131, 132 of each one of the battens 130 to complete the assembly procedure of the hard disk rack 40.

It is understood that the hard disk rack of this embodiment is exemplary illustrated in 1U specification, however, the hard disk rack of the present invention can be constituted in 2U or more than 2U specification by combining the tenon of one of the cartridges with the fastening portion of the other cartridges to stack the plurality of cartridges in the housing, such that the hard disk rack of the present invention can be constituted in different specification such as 1U, 2U or 5U to meet the requirement of usage.

Figure 5A:
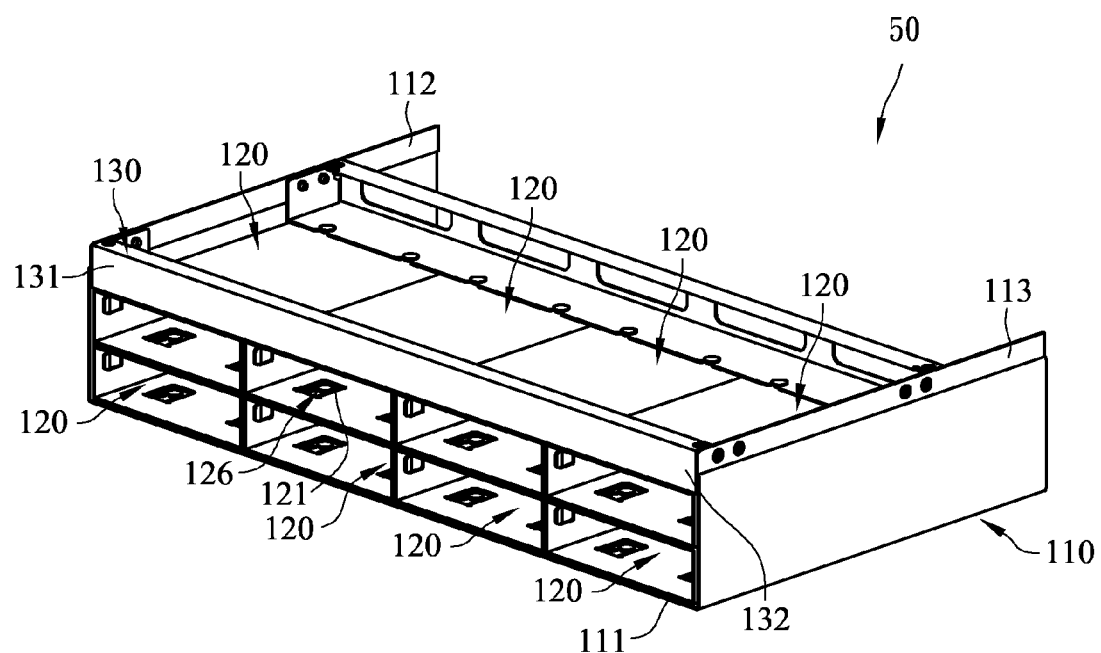
FIG. 5A is a schematic assembly view of a hard disk rack according to a fifth embodiment of the present invention.

For example, as shown in FIG. 5A, in the fifth embodiment of the present invention, a housing 110 of a hard disk rack 50 is constituted by a bottom 111, a first and a second sidewalls 112, 113 in 2U specification, some of the cartridges 120 are disposed on the bottom 111 of the housing 110, such as above-mentioned embodiments, to be a lower layer of the cartridges 120; and then, the rest of the cartridges 120 are stacked on the lower layer to be a top layer of the cartridges 120, wherein the top layer of the cartridges 120 are buckled the tenons of the lower layer of the cartridges 120 by the fastening portions 121 correspondingly. After that, the batten 130 is pressed on the top layer of the cartridges 120, and the first and the second ends 131, 132 of the batten 130 are fixed on the first and the second sidewalls 112, 113 of the housing 110 by the fixing elements such as screws to complete the combination of the 2U hard disk rack 50.

Figure 5B:
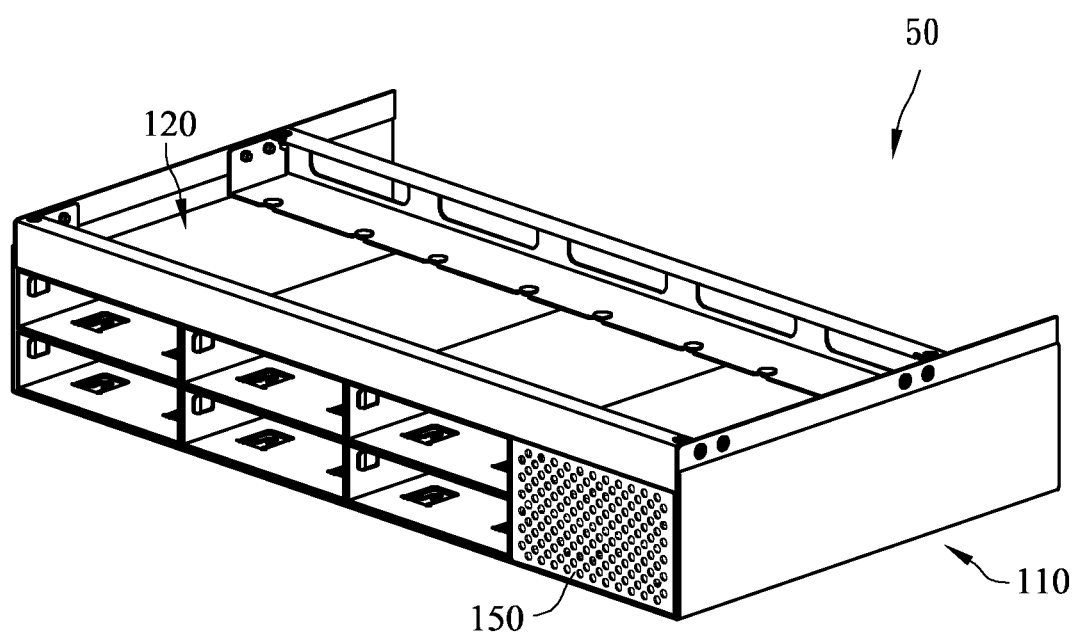
FIG. 5B is a schematic assembly view of a hard disk rack provided with a baffle according to the fifth embodiment of the present invention.

As shown in FIG. 5B, in this embodiment, similarly, after a certain number of the cartridges 120 are stacked in the housing 110, can also be provided with a baffle may be provided to the housing 110 for sheltering from dust or particulate from the surroundings, maintaining the favorable exterior of the hard disk rack 50, and preventing an electrical shock resulted from a careless contact with the electronic components inside the hard disk rack 50. Preferably, the baffle 150 may be provided with a plurality of vents for increasing the heat dissipation of the hard disk rack 50.

As stated above, the present invention is advantageous in that the development costs of the production mold, due to the cartridges are able to stack to each other to constitute the hard disk rack with different specification as required without developing various production molds to meet the requirement of the cartridge specification. In addition, all of the cartridges are provided with an individual back circuit board, such that when the cartridges are assembled in the housing of the hard disk rack, each one of the cartridges can receive an independent power and signal through the back circuit board and the electrical connector. In this way, when the back circuit board of one of the cartridges is broken, it will not interfere with the operation of the other cartridges, and in the operation of repairing, there is just the broken cartridge needed to remove from the housing that is increasing the ease of maintenance of the hard disk rack.

Moreover, a general hard disk module can be a single hard disk drive (HDD) or a hard disk combined with a bracket or an external hard drive housing. In the present invention, when the hard disk module is the HDD combined with the external hard drive housing, the cartridges of the hard disk rack can be a cartridge provided with the fastening portion or a cartridge provided with the fastening portion and the tenon; when the hard disk module is the HDD combined with the bracket, the cartridges of the hard disk rack is further provided with a back circuit board and an electrical connector; and when the hard disk module is the HDD only, the cartridges of the hard disk rack is not only provided with the back circuit board and the electrical connector, but also a bracket for assembling the hard disk module.

Figure 6:
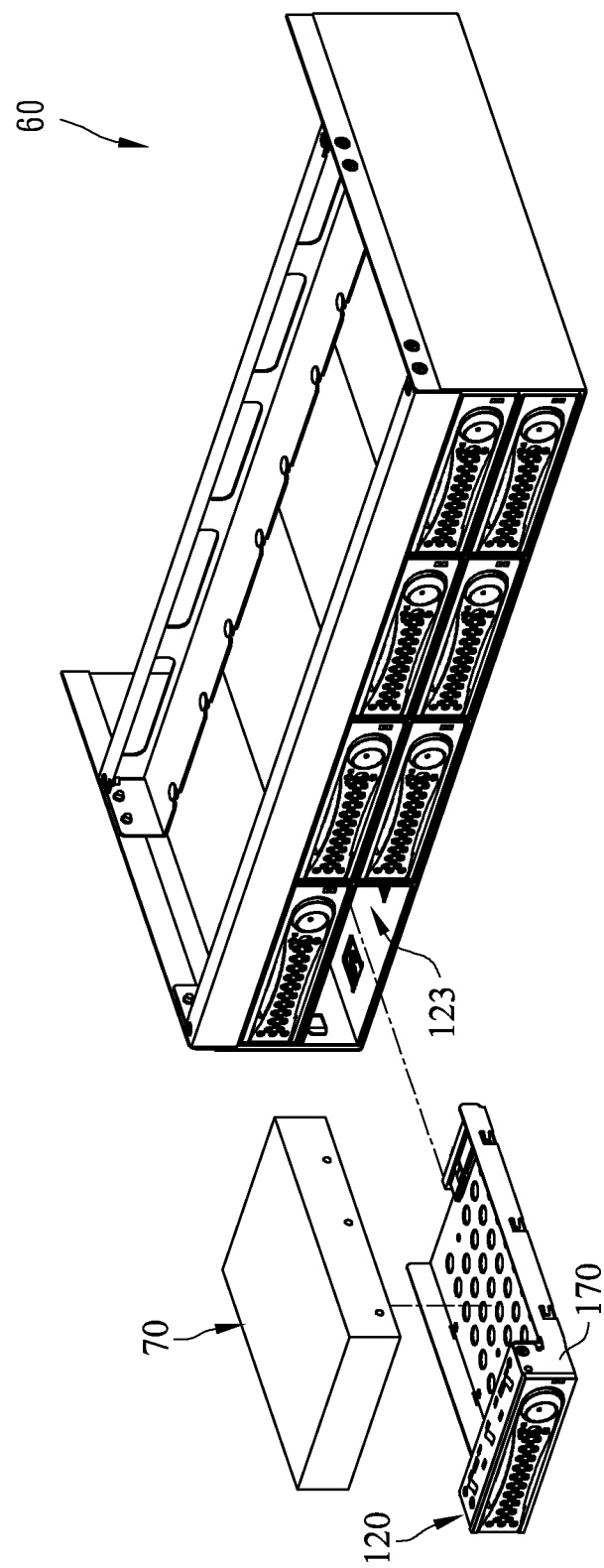
FIG. 6 is a three-dimensional diagram of a hard disk rack according to a sixth embodiment of the present invention.

As shown in FIG. 6, a hard disk rack of the sixth embodiment of the present invention is similar to that of the fifth embodiment except that the cartridge 120 of the hard disk rack 60 further includes a bracket 170 in the cartridge 120, which supports the hard disk module 70 and permits easy installation and removal of the hard disk module 70 via the opening 123.

From the above description of the invention, it is manifest that various techniques can be used for implementing the concepts of the invention without departing from the scope thereof. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It is intended that the scope of the invention is defined by the appended claims.

What is claimed is:

1. A hard disk rack for receiving a plurality of hard disk modules, comprising:
a housing comprising a bottom, a first sidewall and a second sidewall disposed on two opposite sides of the bottom respectively and forming a space together with the bottom, and a plurality of positioning elements disposed within the space and arranged at intervals on the bottom;
a plurality of cartridges detachably disposed on the bottom of the housing, each of the cartridges comprising at least one fastening portion corresponding to one of the positioning elements, wherein each of the cartridges has an opening exposed from the housing, through which the hard disk modules are placed into and removed from the cartridges; and
at least one batten located on one side of the plurality of cartridges away from the bottom and comprising a first and a second end that are opposite each other and detachably connected to the first and the second sidewalls respectively,
wherein each of the cartridges further comprises at least one tenon disposed on one side of the cartridge opposite to the fastening portion, and the batten further comprises a plurality of holding portions arranged at intervals between the first and the second ends and connected with the tenons of the cartridges correspondingly,
wherein the cartridges are stacked in the space, in which the adjacent cartridges are combined by joining the tenon to the fastening portion.

2. The hard disk rack according to claim 1, wherein each of the cartridges further comprises a back circuit board disposed on one side of the cartridge away from the opening and an electrical connector disposed electrically on the back circuit board and facing the opening.

3. The hard disk rack according to claim 1, wherein the first and the second ends of the batten are individually provided with a fastener, and the first and the second sidewalls of the housing are individually provided with a fastening portion to be fastened to the fasteners of the first and the second ends of the batten respectively.

4. The hard disk rack according to claim 1, further comprising a plurality of fixing elements, one end of each of which is connected to the housing, and the other end of each of which penetrates the housing to be connected to the batten.

5. The hard disk rack according to claim 1, further comprising a baffle, wherein a channel is formed between the cartridges and the second sidewall of the housing, and the baffle is located at one side of the housing adjacent to the cartridges and covers the channel.

6. The hard disk rack according to claim 1, wherein each of the cartridges further comprises a detachable bracket for supporting the hard disk modules.

7. A hard disk rack for receiving a plurality of hard disk modules, comprising:
a housing comprising a bottom, a first sidewall and a second sidewall disposed on two opposite sides of the bottom respectively and defining a space with the bottom, and a plurality of positioning elements disposed within the space and arranged at intervals on the bottom;
a plurality of cartridges detachably disposed on the bottom of the housing and each comprising a back circuit board provided with an electrical connector, a plurality of fastening portions corresponding to the positioning elements of the bottom respectively, and a plurality of tenons disposed on one side of the cartridge opposite to the fastening portions, wherein each of the cartridges further has an opening away from the back circuit board and exposed from the housing for receiving the hard disk module, which the hard disk modules are placed into and removed from the cartridges to electrically connect and disconnect to the electrical connector;
two battens each comprising a first end and a second end that are opposite each other and detachably connected to the first and the second sidewalls of the housing respectively, wherein a plurality of holding portions are provided between the first and the second ends corresponding to the plurality of tenons of each of the cartridges, and each of the battens is detachably located on one side of the plurality of cartridges away from the bottom and connected with the tenons of the cartridges by the holding portions; and a plurality of fixing elements, one end of each of which is connected to the housing, and the other end of each of which penetrates the housing to be connected to one of the battens.

8. A hard disk rack for receiving a plurality of hard disk modules, comprising:

a housing comprising a bottom, a first sidewall and a second sidewall disposed on two opposite sides of the bottom respectively and forming a space together with the bottom, and a plurality of positioning elements disposed within the space and arranged at intervals on the bottom;

a plurality of cartridges detachably disposed on the bottom of the housing, each of the cartridges comprising at least one fastening portion corresponding to one of the positioning elements, an opening exposed from the housing, through which the hard disk modules being placed into and removed from the cartridges; and two battens located on one side of the plurality of cartridges away from the bottom and comprising a first and a second end that are opposite each other and detachably connected to the first and the second sidewalls respectively, wherein each of the cartridges further comprises at least one tenon disposed on one side of the cartridge opposite to the fastening portion, and the battens further comprise a plurality of holding portions arranged at intervals between the first and the second ends and connected with the tenons of the cartridges correspondingly, wherein the cartridges are stacked in the space, in which the adjacent cartridges are combined by joining the tenon to the fastening portion, a back circuit board disposed on one side of the cartridge away from the opening.

* * * * *